(12) United States Patent
Arumugam et al.

(10) Patent No.: US 8,102,267 B1
(45) Date of Patent: Jan. 24, 2012

(54) SINGLE ANTENNA SINGLE READER SYSTEM AND METHOD FOR LOCATING A TAG

(75) Inventors: Darmindra D. Arumugam, Pittsburgh, PA (US); Vijayakrishnan Ambravaneswaran, Arlington, TX (US); Daniel W. Engels, Colleyville, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 566 days.

(21) Appl. No.: 12/368,290

(22) Filed: Feb. 9, 2009

Related U.S. Application Data

(60) Provisional application No. 61/026,759, filed on Feb. 7, 2008.

(51) Int. Cl.
*G08B 13/14* (2006.01)
(52) U.S. Cl. ............... 340/572.7; 340/572.1; 340/572.4; 340/539.23; 340/10.1; 340/10.4

(58) Field of Classification Search .... 340/572.1–572.8, 340/10.1–10.4, 539.1, 539.23, 568.1–568.8; 342/44, 56, 109, 127, 133, 139, 146
See application file for complete search history.

(56) References Cited

U.S. PATENT DOCUMENTS

| | | | | |
|---|---|---|---|---|
| 6,356,230 B1* | 3/2002 | Greef et al. | ................... | 342/127 |
| 7,619,524 B2* | 11/2009 | Calvarese | ................... | 340/572.1 |
| 7,932,814 B2* | 4/2011 | Tuttle | .......................... | 340/10.4 |
| 2006/0220861 A1* | 10/2006 | Stobbe et al. | .............. | 340/572.1 |

* cited by examiner

*Primary Examiner* — Anh V La
(74) *Attorney, Agent, or Firm* — Chowdhury & Georgakis, P.C.

(57) ABSTRACT

A single antenna single reader (SASR) system and method for locating a tag. The reader connects to a single antenna that is in motion. The reader transmits an interrogation signal to the tag. The reader receives a response signal from the tag. The reader determines the range of the tag from the reader, the received signal strength (RSS) of the response signal at the reader from the tag, and the maximum correlation of the response signal at the reader from the tag. The reader determines the location of the tag using range of the tag from the reader, received signal strength and maximum correlation of the response signal.

16 Claims, 10 Drawing Sheets

SINGLE ANTENNA SINGLE READER SYSTEM AND METHOD FOR LOCATING A TAG

CROSS REFERENCE TO RELATED APPLICATION

This application claims priority under 35 USC §119(e)(1) of Provisional Application No. 61/026,759, filed Feb. 7, 2008, incorporated herein by reference.

TECHNICAL FIELD OF THE INVENTION

The present invention generally relates to location and identification of a tag. More particularly, the invention relates to single antenna single reader (SASR) system for locating surface acoustic wave (SAW) radio frequency identification (RFID) tag.

BACKGROUND OF THE INVENTION

Multi-trillion dollar losses occur every year due to products that are lost, stolen, misrouted, over/under stocked, out-of-date, and so on. Surface acoustic wave (SAW) radio frequency identification (RFID) tags that attach to products may limit such losses by allowing determination of the location of each product that has a tag attached. Commercial applications require large numbers of SAW RFID tags each with a unique ID number for product location identification.

SUMMARY OF THE INVENTION

In one aspect, a method for locating a tag, includes but is not limited to transmitting an interrogation signal from a reader with a single antenna to the tag, wherein the single antenna is in motion; receiving a response signal at the reader from the tag; determining the range of the tag from the reader; determining the received signal strength (RSS) of the response signal at the reader from the tag; determining the maximum correlation of the response signal at the reader from the tag; and determining the location of the tag using range of the tag from the reader, received signal strength and maximum correlation of the response signal.

In one aspect, a system for locating a tag includes but is not limited to a reader; a reader antenna operably coupled to the reader, wherein the reader antenna is in motion; a tag operably coupled to the reader antenna, said reader transmitting an interrogation signal to the tag and receiving a response signal from the tag; wherein the reader determines the range of the tag from the reader, received signal strength (RSS) of the response signal at the reader from the tag, and the maximum correlation of the response signal at the reader from the tag; wherein the reader determines the location of the tag using range of the tag from the reader, RSS, and maximum correlation of the response signal.

DETAILED DESCRIPTION OF PREFERRED EMBODIMENTS

A novel SAW RFID enabled real-time location system (RTLS) is disclosed that accurately locates a tag in 2-dimensional (2D) localization system. The method of detecting the tag is based upon the physics of electromagnetic radiation and operation of SAW RFID system. The RTLS system combines a SAW RFID system using a single antenna single reader (SASR) with Radio Detection and Ranging (RADAR) techniques. The method allows 2D localization using the angular rotation of the single reader's single antenna.

Surface acoustic wave (SAW) radio frequency identification (RFID) tags are read-only transponder devices. Such tags allow an ID tag numbering system that is capable of providing a unique ID number designated as an electronic product code (EPC) for each product. Surface acoustic wave RFID tags utilize a piezoelectric substrate such as lithium niabate and have one metal layer upon the substrate to create a functioning tag. SAW RFID tags do not need a power source because these tags do not use transistors, capacitors, diodes or other functional elements. SAW RFID tags communicate with a reader using radio frequency communications. Each SAW RFID tag carries and communicates an EPC identifier number that is used to identify the object to which the tag is affixed. SAW RFID tags are programmed during the manufacturing process and do not allow modification of the tag identifier number.

The piezoelectric substrate of the SAW RFID tag remains electrically neutral because the positive and negative charges on the substrate are symmetrically distributed. Upon application of mechanical stress to the substrate, the charge symmetry is disturbed causing charge asymmetry. This charge asymmetry generates a voltage across the piezoelectric substrate. This "piezoelectric effect" can be defined as the relationship of energy transfer from the mechanical to electrical domain and vice versa using Gauss' law and Hooke's law. The relationship between the mechanical and electrical domains is governed by the following equations:

$$S_i = s_{ij}^E T_j + d_{ki} E_k \quad (1)$$

$$D_l = d_{lm} T_m + \epsilon_{ln}^T E_n \quad (2)$$

where $i, j, m = 1, \ldots, 6$ and $k, l, n = 1, 2, 3$. In Equations (1) and (2) S, D, E and T are the strain, dielectric displacement, electric field and stress respectively, and $s_{ij}^E$, $d_{ki}$ and $\epsilon_{ln}^T$ are the elastic compliances, the piezoelectric constants and the dielectric permittivity respectively. Thus, the voltage generated by the piezoelectric effect is directly dependant on the force (mechanical stress) applied to the piezoelectric substrate. The direction in which the stress is applied is important because application of stress on one side or direction will generate more voltage in that direction/side. Thus, in a SAW based RFID system, it is this relationship of stress and strain that governs surface acoustic wave generation and conversion to electromagnetic radiation through the interdigital transducer (IDT).

Figure 1:
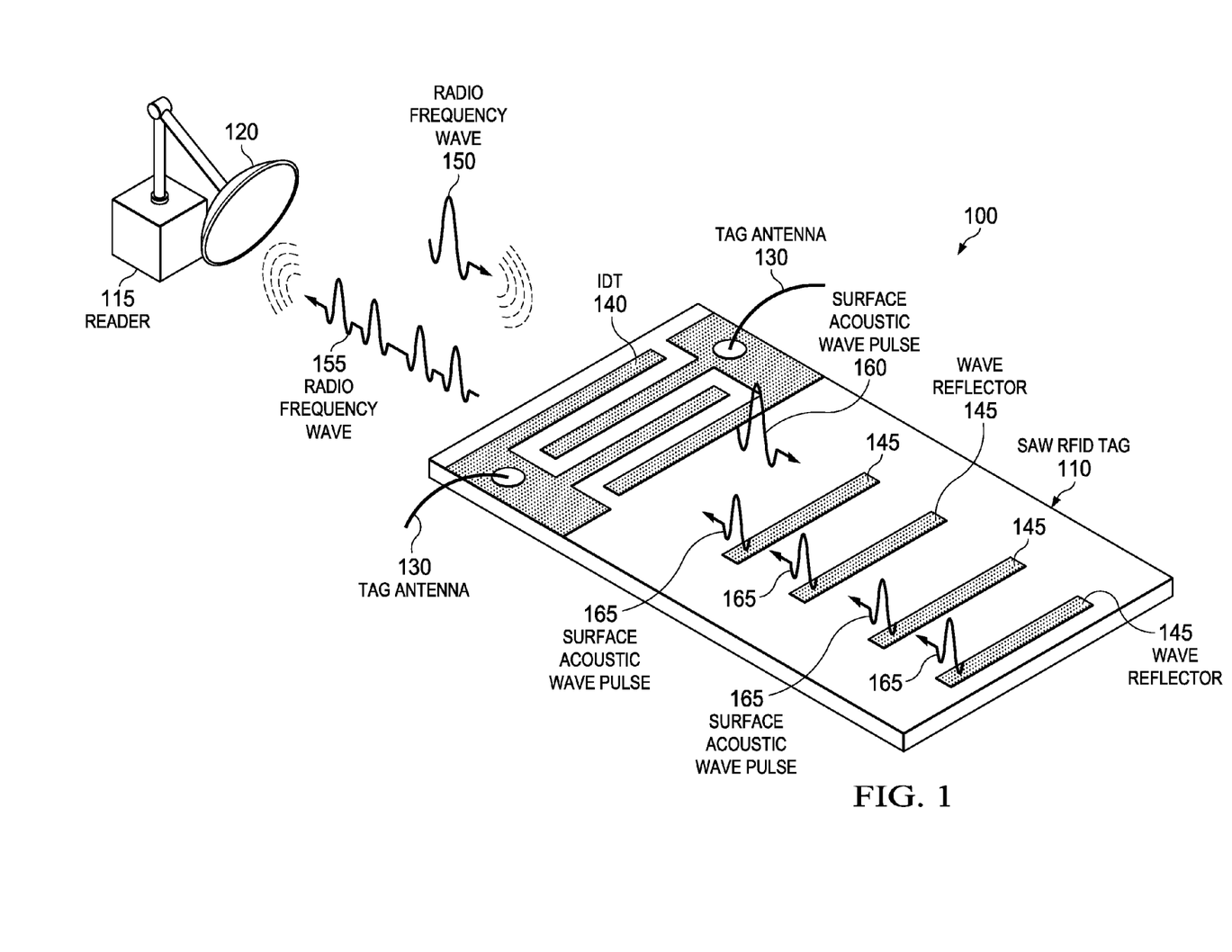
FIG. 1, in accordance with some embodiments of the invention, is a schematic of a single antenna single reader SAW RFID system.

FIG. 1, in accordance with some embodiments of the invention, shows a SAW RFID system 100 including a tag 110, tag antenna 130, reader 115, reader antenna 120 and information subsystem (not shown). The information subsystem is coupled to the reader and utilizes the information captured by the reader to identify the tag and its location. As shown in FIG. 1 and described above, a SAW RFID system operates by relying on the conversion of radio frequency waves 150, 155 into nano-scaled mechanical or acoustic waves 160, 165 and vice-versa.

SAW RFID tag 110 is a one-port device that includes an interdigital transducer (IDT) 140 and a series of wave reflectors 145. IDT 140 is directly connected to tag's antenna 130. The tag's antenna 130 both receives the interrogation radio frequency signal 150 from reader 115 and radiates the reply radio frequency signal 155 generated by the tag's reflectors 145. In accordance with some embodiments of the invention, tag antenna 130 may be a patch antenna.

Figure 2:
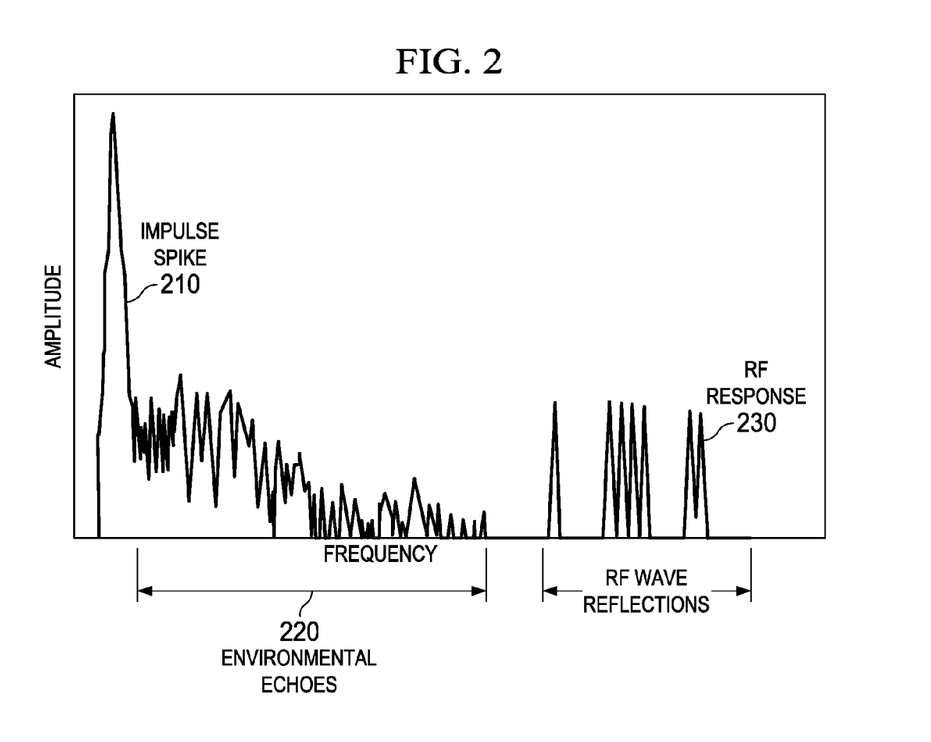
FIG. 2 is a graph of amplitude versus frequency showing reader interrogation pulse, environmental echoes and RFID tag echoes.

Referring to FIG. 2, in surface acoustic wave based RFID systems, reader 115 sends out an impulse spike 210 or ramp in an allotted frequency band such as the 2.45 GHz industrial, scientific and medical (ISM) band. The SAW tag 110 receives this electromagnetic signal and converts it into a mechanical surface acoustic wave 160 by way of the IDT 140. The surface acoustic wave 160 propagates across the surface of the piezoelectric substrate in the form of Rayleigh waves away from the IDT 140. Partial wave reflectors 145, created from the deposited metal and located at precise distances from the IDT 140, partially reflect the mechanical surface acoustic wave on the substrate. The series of reflections creates a unique sequence of pulses 165 (based on the deposited reflectors on the piezoelectric substrate) propagating towards the IDT 140. The unique sequence of SAW pulses 165 are converted into radio frequency electromagnetic (EM) waves 155 by IDT 140. Tag antenna 130 transmits the radio frequency waves 155 to reader 115 via reader antenna 120. As shown in FIG. 2, the unique radio frequency wave pattern communicated by the tag, which is a sequence of reflections 230 of the reader's sent signal, is received by the reader 115. Reader 115 using a specific identification algorithm identifies the unique radio frequency wave pattern to decode the unique tag ID number. As described in more detail below, the information subsystem utilizes the information captured by the reader to identify the tag and its location. The physical operating characteristics and communication capabilities of SAW RFID systems allows the reader to capture information that includes the time of flight (TOF) from the tag of the radio frequency waves. The TOF enables accurate determination of the distance of the tag from the reader. This inherent feature of SAW RFID systems make them well suited for use in low cost real-time location systems (RTLS).

Figure 3A:
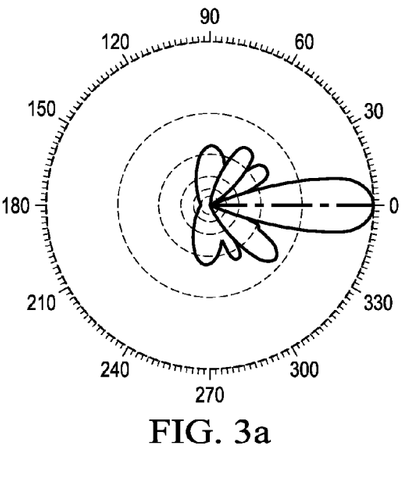
FIG. 3(a) shows vertical gain pattern of the HG2418P antenna from Hyperlink Technologies™.
Figure 3B:
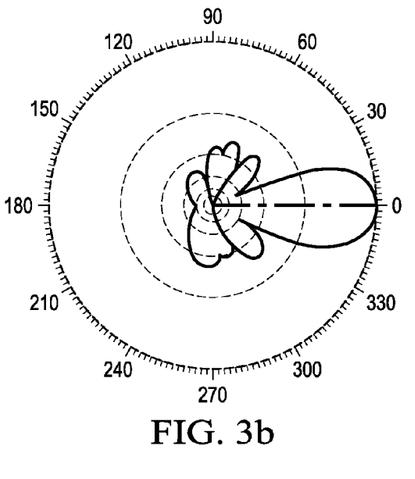
FIG. 3(b) shows horizontal gain pattern of the HG2418P antenna from Hyperlink Technologies™.
Figure 3C:
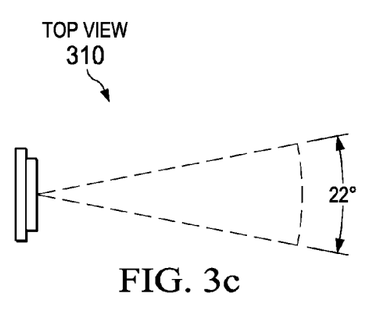
FIG. 3(c), in accordance with some embodiments of the invention, is a schematic of an antenna showing the antenna beam from top view.
Figure 3D:
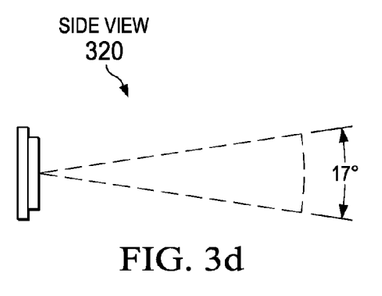
FIG. 3(d), in accordance with some embodiments of the invention, is a schematic of an antenna showing the antenna beam from side view.
Figure 3E:
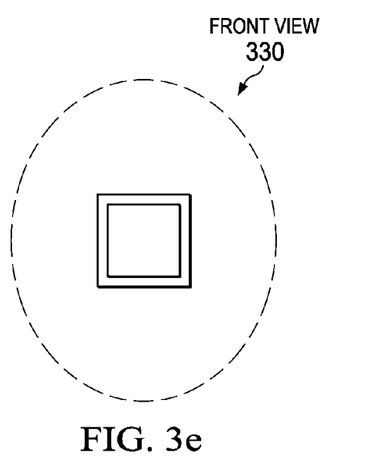
FIG. 3(e), in accordance with some embodiments of the invention, is a schematic of an antenna showing the antenna beam from front view.
Figure 3F:
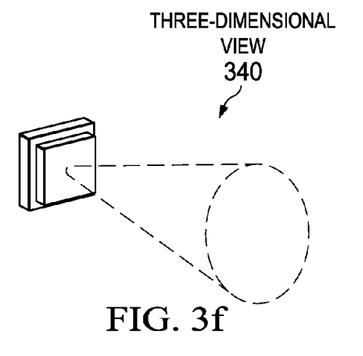
FIG. 3(f), in accordance with some embodiments of the invention, is a schematic of an antenna showing the antenna beam in a three-dimensional view.

In accordance with some embodiments of the invention, reader 115 may be a Model 501 SAW RFID reader manufactured by RFSAW™ Inc. RFSAW™ Inc reader has an operating frequency in the ISM frequency band of 2.45 GHz and tag read speed of 1000 samples/second for data collection. In accordance with some embodiments of the invention, reader antenna 120 may be a model HG2418P manufactured by Hyperlink Technologies™. HG2418P reader antenna has a horizontal beam width of 22 degrees, vertical beam width of 17 degrees, and electrical specifications as given in Table 1. FIG. 3(a) shows the vertical gain pattern that produces the vertical beam of the HG2418P antenna. FIG. 3(b) shows horizontal gain pattern that produces horizontal beam of the HG2418P antenna. FIGS. 3(c)-3(f), in accordance with some embodiments of the invention, shows the antenna beam from different perspective views. Top view 310 in FIG. 3(c) clearly shows the horizontal beam width of 22 degrees for the HG2418P antenna. FIG. 3(d) side view 320 shows the vertical beam width of 17 degrees for the HG2418P antenna. Looking at the antenna from a front view 330 in FIG. 3(e) shows a cross section of the cone formed by the horizontal beam width and vertical beam width. For HG2418P antenna, the horizontal beam width and vertical beam width create a resultant cone shape which emanates from the antenna as shown in three-dimensional view 340 in FIG. 3(f).

As can be seen in FIG. 3(a), FIG. 3(b), FIG. 3(c), FIG. 3(d), FIG. 3(e) and FIG. 3(f) the vertical gain pattern and corresponding vertical beam are narrower than the horizontal gain pattern and horizontal beam. As described in more detail below, the horizontal and vertical gain pattern of the HG2418P antenna creates a narrow beam as shown in FIGS. 3(c)-3(f) that benefits the location detection method used. The narrow beam of the HG2418P antenna decreases the potential locations of the tag on the arc when the tag is read.

TABLE 1

Electrical specifications of the HG2418P antenna from Hyperlink Technologies ™

| Electrical Specifications | Values |
|---|---|
| Frequency | 2400-2500 MHz |
| Gain | 18 dBi |
| Horizontal Beam Width | 22° |
| Vertical Beam Width | 17° |
| Polarization | Vertical or Horizontal |
| Front to Back Ratio | >25 dB |
| Cross Polarization Rejection | >25 dB |
| Impedance | 50 Ohm |

Design principles and parameters of SAW tags are discussed to allow a better understanding of the mechanisms by which SAW RFID system operates. Design parameters such as delay time τ and the frequency f of the SAW tag 110 may be varied as discussed in more detail below. A change in sensitivity of the SAW tag 110 results in a change in both the delay time r and frequency f of the SAW tag. This is shown in Equation 3 and Equation 4, where $S_y$ is the sensitivity of the tag.

$$\tau(y_o+\Delta y)=\tau(y_o)[1+S_y\Delta y] \quad (3)$$

$$f(y_o+\Delta y)=f(y_o)[1+S_y\Delta y] \quad (4)$$

Equations 3 and 4 may be used in SAW RFID system design to suppress the environmental echoes 220 shown in FIG. 2 received by the reader from the SAW RFID tag. Effective suppression of the environmental echoes 220 requires some type of delay time in the processing of the environmental echoes. Techniques to create delay time include a) reflective delay time, b) resonator, and c) dispersive delay time.

The reflective delay time technique, as described in detail below, adds propagation path delay twice to allow smaller tags and is a good choice to obtain the necessary delay for the effective suppression of the environmental echoes. The resonator delay technique requires that the RF impulse spike 210 excites a resonator that is than utilized to control a gating mechanism. This gating mechanism is used to delay the RF wave reflection signals 230 in an attempt to filter the environmental echoes 220. The dispersive delay time technique uses up-chirp/down-chirp mechanism that, respectively, utilizes high amplitude/low amplitude sinc signal from reader to reduce the sensitivity parameter of the tag. Furthermore, the dispersive delay time technique also benefits from the Doppler Effect.

In the reflective delay time technique, the changes in delay time difference between two reflected signals y, $y_o$ are depicted in Equation 5 and Equation 6:

$$\Delta\tau_{2-1}=[\tau_2(y)-\tau_1(y)]-[\tau_2(y_o)-\tau_1(y_o)] \quad (5)$$

$$\Delta\tau_{2-1}=[\tau_2(y_o)S_{y,2}-\tau_1(y_o)S_{y,1}]\Delta y \quad (6)$$

Using the delay differential as related above, it is mathematically easy to realize the phase difference $\Delta\phi_{2-1}$ at the carrier frequency $f_o$, when the system is considered coherent. Equation 7 and Equation 8 are used to exemplify the phase difference and the sensitivity of the reflective delay time (referred to as reflective delay line in Eqn. 7 and Eqn. 8):

$$\Delta\phi_{2-1}=2\pi f_o\Delta\tau_{2-1}=S_y^{delay\,line}\Delta y \quad (7)$$

$$S_y^{delay\,line}=2\pi f_o[\tau_2(y_o)S_{y,2}-\tau_1(y_o)S_{y,1}] \quad (8)$$

Using the equations above, it is easily noticed that for a 2.45 GHz center frequency $f_o$ and a delay time difference of 1.3 μs, the sensitivity has a factor of about 20,000 as shown in Equation 9.

$$S_y^{delay\,line}\approx 20000 S_y \quad (9)$$

FIG. 2 illustrates use of the reflective delay time technique in removing the RF response including RF wave reflections 230 from the environmental echoes by inserting time delay.

In accordance with some embodiments of the invention, the SAW RFID system and method can locate a tag with high accuracy using read range and maximum correlation parameters. Determination of the read range and maximum correlation rely on time-of-flight, signal strength, signal pattern matching and directionality measurements collected by the reader.

Time-of-flight (TOF) may be defined as the time taken for a signal to travel from point A to point B. In SAW RFID system, time-of-flight $f$(TOF) is time for RF wave 150 or 155 to travel one-way from reader antenna 120 to tag antenna 150 or vice versa. The time delay $f$(Tag) because of the reflectance of the SAW wave 160 on wave reflectors 145 and travel of the RF wave reflections is a known constant value based on the design of the piezoelectric material and the reflectors. Thus, an accurate measurement of the time ΔT taken for the radio frequency wave signal to return to the reader from when the impulse spike was sent out will yield a precise estimate of the distance between the reader and the tag. Equation 10 may be used to determine the one-way time-of-flight from reader antenna to tag antenna denoted by function $f$(TOF). In Equation 10, the total identification round trip time ΔT of the SAW tag can be accurately measured and the tag time delay function $f$(Tag) is known constant value based on design of piezoelectric material and reflectors. Thus, in Equation 10, subtracting $f$(tag) from ΔT and dividing by 2 will determine the one-way time-of-flight from reader antenna to tag antenna $f$(TOF) and estimate of distance between reader and tag may be determined.

$$\Delta T\approx 2f(TOF)+f(Tag) \quad (10)$$

Figure 4:
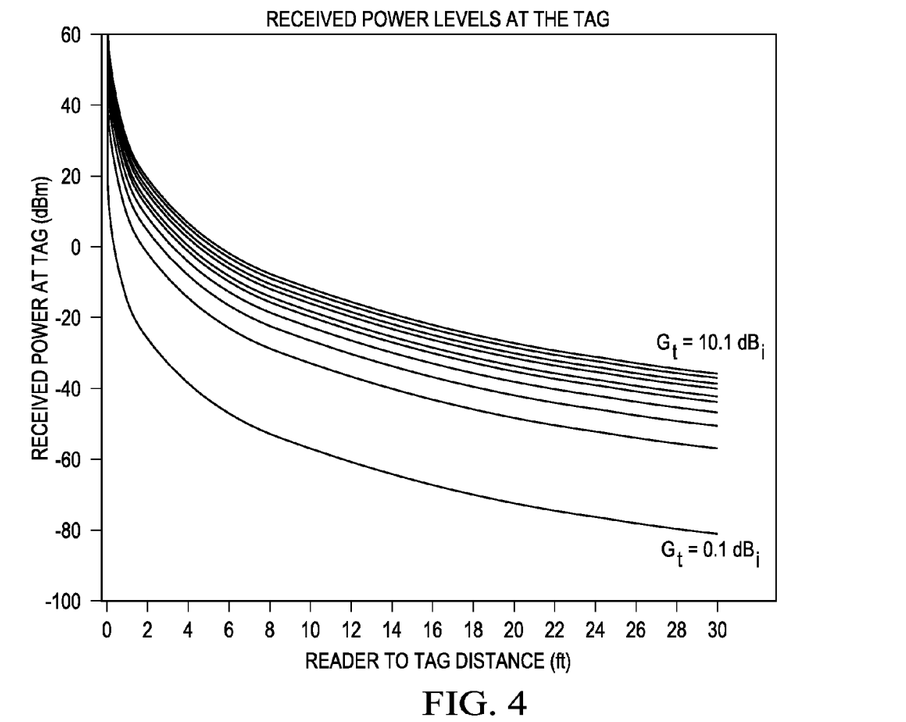
FIG. 4 is a graph of received signal strength at reader from RFID tag versus reader to RFID tag distance.

Signal strength is another measurement determined by the reader that may be used to calculate the read range and maximum correlation. Received signal strength (RSS) may be defined as the signal strength of the SAW RFID tag received at the reader. RSS may be used as an indication of the read range in many circumstances. However, because the power levels observed by the SAW RFID readers are low, RSS measurements are often not highly accurate. Averaging may be done of multiple RSS samples to allow for a more accurate reading. RSS measurements from the reader may be used to explain the skewing problem. The skewing problem occurs when the tag skews or slides away from the normal incidence of the readers' antenna. This may occur because the height of the reader and the SAW tag are different from each other. As described in more detail below, when the skewing problem occurs, the RSS measurement at the reader changes significantly with high repeatability. For the skewing problem, the power of the received signal $P_r$ at the receiver can be expressed using a modified version of the Friis formula and is shown in Equation 11.

$$P_r=10\times\log_{10}\left[\left(\frac{\lambda}{4p}\right)^2 G_t G_r p\frac{1}{r^N}\frac{1}{(1+(r/R_o))^{N_B-2}}\right] \quad (11)$$

where $P_r$ is the received power, $P_t$ is the transmitted power, $G_r$ is the reader antenna gain, $G_t$ is the tag antenna gain, λ is the wavelength (c/f), p is the polarization mismatch, N is the variation of power before the breakpoint, $N_B$ is the increased signal loss beyond the breakpoint and $R_o$ is the breakpoint distance as depicted in Equation 12.

$$R_o=\frac{4h_t h_r}{\lambda} \quad (12)$$

where $h_r$ is the height of the tag antenna and $h_t$ is the height of the reader antenna above the surface. Given a specified tag turn on power of 0.3 μW, one can successfully estimate the reader to tag distance by using Equations 11 and 12. FIG. 4 shows a graph of received signal strength at reader from tag versus reader to tag distance for given tag antenna gain range of 0.1 dBi to 10.1 dBi. In FIG. 4, the values used in equations 11 and 12 for the specified model are $P_t$=20 dBm, $G_r$=18 dBi, $G_t$=0.1:1:10.1, f=2.45 GHz, p=1.0, N=2, $N_B$=4, $R_o$=55.2 m, $h_r=1.3$ m and $h_t=1.3$ m. These values are suitable for a SAW based RFID system operating in a field environment and antennas close to the surface. Examining FIG. 4, in some embodiments of the invention, a maximum operating range for the 6 dBi tag antenna present in the single patch antenna may be approximately 28 feet. Further field tests have validated this model and proven that a simple signal strength measurement could yield tag range accurately in simple environments.

Signal pattern matching or signal correlation is another measurement determined by the reader that may be used to calculate the maximum correlation. Signal correlation is performed by over-sampling the received radio frequency wave 155. The oversampled values of the RF wave 155 are averaged at the information subsystem connected to the reader for the purpose of redundancy. The averaging function is performed so as to produce the maximum correlation. Maximum correlation may be defined as a stringent comparison of the ideal tag response as compared to the received tag responses. For each SAW RFID tag, the ideal tag response is a known constant value. Every deviation from the ideal tag response is generally quite unique in nature and is often caused by environmental randomness. However, it is noticed that the ideal maximum correlation of 1.0 reduces as the tag travels further from the reader or away from the normal incidence. Thus, these factors should be taken into consideration when considering location of the tag.

As mentioned above, maximum correlation is a stringent pattern matching, done to identify similarities between the received tag response and the ideal tag response. Determination of maximum correlation takes into account received signal strength and, to a limited extent, other environmental factors. Maximum correlation also gives information on the comparative distance of the tag from the line-of-sight (LOS) of the reader (see FIG. 5) and also the relative speed of the tags movement. If the tag moves in the same direction as the reader and at a higher angular velocity than the reader, the width of the impulse spike sent by the reader is perceived to be smaller than expected by the tag. The maximum correlation calculation takes into consideration the initial conditions of the tag and also the reader movements. This is because the tag velocity vectors normal to the LOS of the reader need to be considered along with initial conditions.

Figure 5:
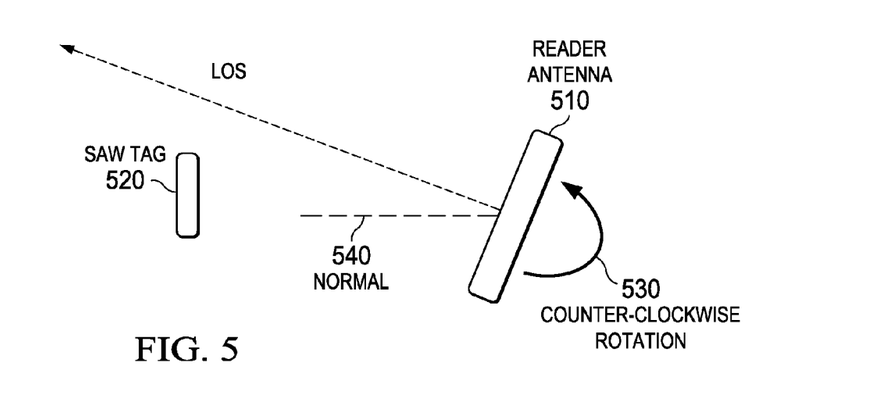
FIG. 5, in accordance with some embodiments of the invention, is a schematic of a single antenna single reader (SASR) system for locating SAW RFID tag.

In accordance with some embodiments of the invention, the tag location may be regarded as a probability arc around the reader. The probability arc may be defined by the maximum correlation and reader LOS as well as reader movement because the reader is rotating counter-clockwise (see FIG. 5). The probability arc allows the assumptions that the tags pattern is known and that the environment is somewhat ideal. Experiments tend to show that although the environment does play some role, maximum correlation values are fairly consistent. Equation 13 is used to model the probability $P_{tag}$ that the tag is at a point in 2D space given it was read with a certain maximum correlation value:

$$P_{tag} \cong MC \cdot e^{1-MC} \qquad (13)$$

where, MC is the maximum correlation of the tag. Using this and the TOF information to calculate the range, the analysis is conducted to show the probability arc for a system normalized for a reader moving with 360 degree counter-clockwise rotation.

Directionality measurements collected by the reader may be used to calculate the read range and maximum correlation. The directionality of the tag and reader depends largely on the tag and reader antenna characteristics and properties. Thus, for example, a linearly polarized antenna as shown in FIGS. 3(*a*)-3(*c*) is far more directional than a circularly polarized antenna. Similarly, a monopole or dipole antenna is far less directional than a patch or double patch antenna. As the directionality of the tag and reader antennas are fixed properties, directionality may not be varied for active location of the tag. Active tag location methods cause changes in variables in real time for accurate information collection during real-time tag location efforts. Directionality measurements of the tag and reader are passive location techniques. As used in SASR system and method, directionality measurement is used to simplify the tag location problem. A linearly polarized antenna with known beam widths is used in a vertical orientation as shown in FIGS. 3(*a*)-3(*c*) for the readers' antenna. For the tag, a single patch antenna is used to implement passive location techniques.

Figure 6:
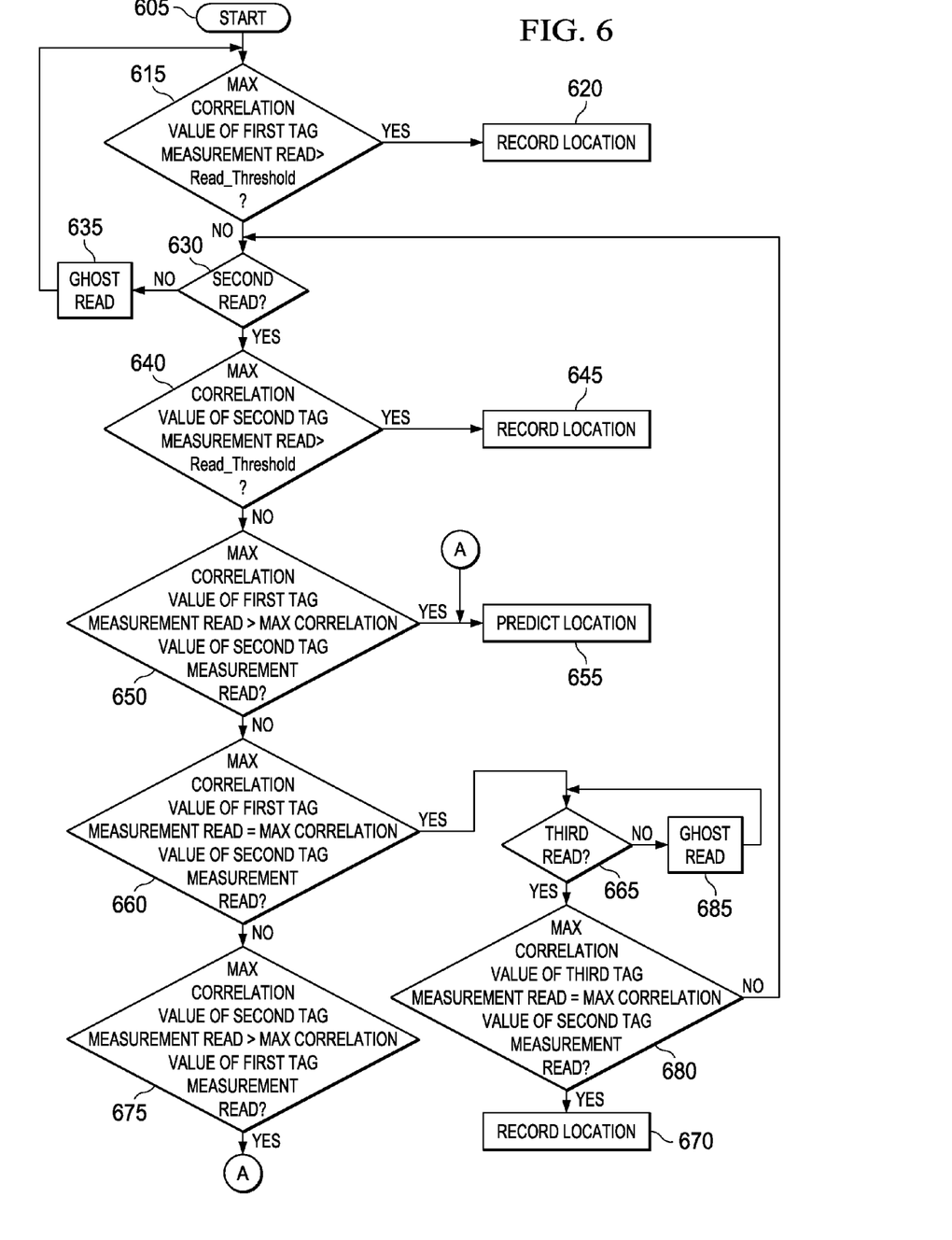
FIG. 6, in accordance with some embodiments of the invention, shows a flowchart of single antenna single reader (SASR) method for locating SAW RFID tag.

Turning now to FIG. 5, in accordance with some embodiments of the invention, a schematic of a single antenna single reader (SASR) system for locating SAW RFID tag 520 is shown. FIG. 6, in accordance with some embodiments of the invention, shows a flowchart of single antenna single reader (SASR) method for locating SAW RFID tag. In accordance with some embodiments, the method of FIG. 6, described in detail below, determines read measurements from the tag 520 as the reader antenna 510 rotates counter-clockwise 530 around a normal 540 at a constant angular velocity. The read data measurements obtained from the SAW tag 520 are compared with a stored pattern in information subsystem connected to the reader 510 to calculate maximum correlation.

As shown in FIG. 5, the single antenna single reader (SASR) has one reader antenna and one reader to track all of the tags in the field. As described above, the SASR method uses time-of-flight (TOF), received signal strength (RSS), maximum correlation and passive directionality measurements to determine the location of the tag. Because RSS varies with the environment, accurate determination of tag location uses maximum correlation and TOF in combination with RSS measurements. The SASR system shown in FIG. 5 can determine within a few tens of centimeters the location of the tag along a semicircular arc at a range r from the reader with high probability (see discussion above). Using RADAR techniques, the readers' 510 angle relative to normal 540 may be varied as shown in FIG. 5 to determine the location of the tag in the arc in real time with high accuracy. In accordance with some embodiments of the invention, rotation of the reader is done in a counter-clockwise circular direction and may cover any rotation angle up to 360 degrees.

The flowchart of FIG. 6 for single antenna single reader (SASR) method locates the tag by performing multiple tag measurement data reads and determining if the read is above a threshold. Read ratio may be defined as the ratio of the actual reads that are successful for every thousand read attempts. In accordance with some embodiments of the invention, the reader is assumed to have a read ratio of 1.0 at LOS (FIG. 5) and zero elsewhere. Thus, the tags are assumed to be normal to the LOS so that the tag faces the reader antenna.

In accordance with some embodiments, one goal of the SASR method is to locate the tags at any given time with a single reader. Thresholding of each read measurement allows the SASR method to be robust to noise and other external disturbances. The SASR method is implemented for two cases of 1) tag is stationary while reader antenna rotates at a given angular velocity and 2) tag in motion while reader antenna rotates at a given angular velocity.

In the case of stationary tag while reader antenna rotates at a given angular velocity, the tag is stationary for a substantial amount of time or fixed to a particular location. The reader antenna has a clear line-of-sight (LOS) of all the tags in its space. The reader performs a tag measurement by transmitting an impulse spike and receives the return SAW RF wave reflections from the tag. The information subsystem connected to the reader compares the received SAW wave reflection pattern of the tag to the ideal pattern stored for the tag in the information subsystem. Comparison of the two patterns gives the maximum correlation value which is used for identification of the tag. The error probability of locating the tag decreases as the value of the maximum correlation increases. The tag can be located with the highest accuracy when the maximum correlation value is 1.0 or higher. At maximum correlation value of 1.0 or for tag measurements where the maximum correlation is highest, the location of the tag is recorded and its coordinates stored for future reference.

For the case of a tag in motion while reader antenna rotates at a given angular velocity, the tags that are in motion with higher velocity vectors normal to the LOS than the readers' angular velocity are evaluated the same as stationary tag case. If the tags in motion have lower velocity vectors normal to the LOS than the reader's angular velocity, then the thresholding technique shown in FIG. 6 may be used. A parameter called the read threshold is defined by the user. The read threshold may be adaptive based on the environment or application—thus, a high read threshold may reduce errors but only work in a noise free environment. As shown in block 615, if a first tag measurement read has a maximum correlation value above the read threshold, the first tag measurement read is stored as a valid read by the information subsystem and the location of the tag is recorded 620. Another tag measurement read starts again in block 605. If however the tag measurement read has a maximum correlation value below the read threshold, the reader will initiate a second tag measurement read 630. If the second tag measurement read is not acquired within a set period of time, the tag measurement read is considered a ghost read 635 and it is ignored. If the second tag measurement read has a maximum correlation value above the read threshold 640, the first tag read is discarded and the second tag measurement read is stored as a valid read by the information subsystem and the location of the tag is recorded 645. After recording of the location of the tag 645, another tag measurement read starts again in block 605.

If the first tag measurement read and the second tag measurement read have maximum correlation values below the read threshold, the maximum correlation values of the two reads are compared 650, 660, and 675 to predict the side locations of the tag relative to the reader on the arc. Using a variant of Equation 13, a valid prediction can be made as to the location of the tag 655. After prediction of the location of the tag 655, another tag measurement read starts again in block 605. If, however, the maximum correlation values of the two tag measurement reads are equal 660, a third tag measurement read attempt is initiated 665. If the third tag measurement read is not acquired within a set period of time, the third tag measurement read is considered a ghost read 685 and a third read is reattempted 665. After a successful third tag measurement read, the maximum correlation value of the third tag measurement read is determined. If the maximum correlation values of all three tag measurement read attempts are the same 680, the tag location is recorded based precisely on Equation 13 670. Another tag measurement read starts again in block 605. Finally, if the maximum correlation value of the third tag measurement read and second tag measurement read are not the same, then the second tag measurement read is performed again 630. The method of FIG. 6 allows a true two-dimensional location of the SAW RFID tag by implementing RADAR techniques and a rotating antenna system.

Figure 7:
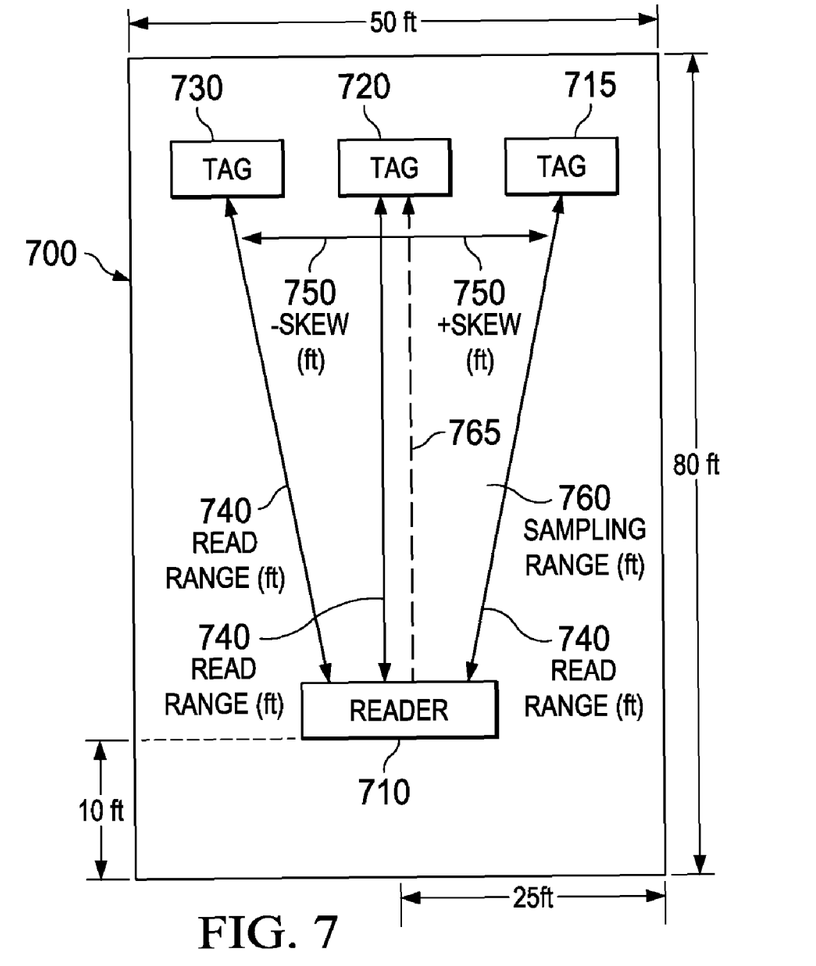
FIG. 7 shows a SASR system for locating SAW RFID tags in a large room.

Turning now to FIG. 7, SASR system 700 for locating SAW RFID tags 715, 720, and 730 in a large room is shown. The large room has dimensions of 50 ft by 80 ft. Reader 710 is placed in the large room 25 ft from the side walls and 10 ft from the back wall. A tag is placed at varying distances, ranging from 2.8 ft to 12.4 ft, along the reader's normal (vertical direction), also referred to as the reader's line of sight. For the implementation shown in FIG. 7, the reader is left stationary while the tag is moved. A complete test, as described below, is conducted before moving the tag to a different distance (tag-reader separation). For each test, the tag is initially placed along the readers' normal for a particular distance, ex. 2.8 ft. and 1000 reads are conducted at that location. The maximum correlation, received signal strength (RSS), the read range 740, and the amount of actual reads for every thousand read attempts (readability ratios) are recorded. The tag is then moved one foot at a time on the right side (i.e. 1 ft right of the original location) referred to as the skew distance 750 and the test is repeated. The tag is moved (distance between 2.8 ft to 12.4 ft along reader's normal) and the test repeated until it is no longer within the read range of the SAW reader. Similarly, the experiment is repeated for the left side. FIGS. 8(a)-8(d) present detailed experimental results for the read range, maximum correlation, RSS and readability ratios. As described below, FIGS. 8(a)-8(d) show that the use of maximum correlation yields higher accuracy tag location than using received signal strength and readability ratios alone, even in ideal conditions.

In FIG. 7, the sampling range 760 may be defined as the distance between the tag and the reader at normal incidence 765. For each test, the sampling range is continuously increased between 2.8 ft to 12.4 ft to account for various distances of the tag from the reader. Skew 750 may be defined as the degree from which the tag is moved away from the line-of-sight normal incidence 765. Skew 750 is measured in feet and has a positive or negative component. Read range 740 is determined by the reader 710 and information subsystem (not shown in FIG. 7) coupled to the reader 710 and is measured in feet. Read range 740 is determined using the time-of-flight information and is recorded for every combination of skew 750 and sampling range 760.

Figure 8A:
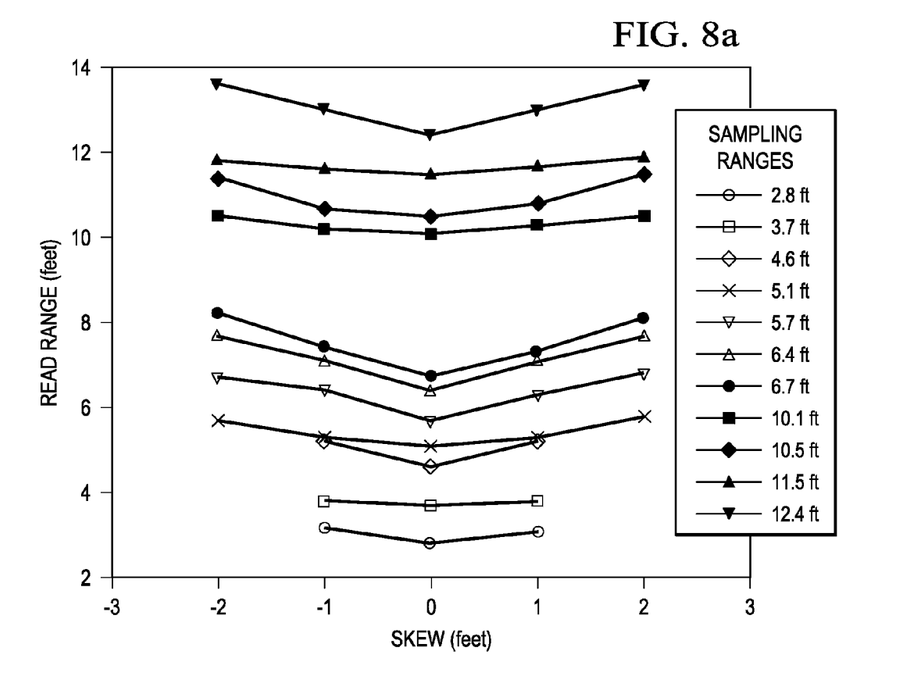
FIG. 8(a) is a graph of read range versus skew for different sampling ranges for SASR system of FIG. 7.

FIG. 8(a) shows a graph of read range 740 in feet plotted against skew 750 in feet for different sampling ranges 760 for SASR system of FIG. 7. As can be seen in FIG. 8(a), there exists a trend that shows the read ranges 740 incrementing as the skew 750 increases for each sampling range 760. This increase in read range 740 may be observed because an increase in skew 750 as depicted in FIG. 7 relates to an increase in tag-reader separation.

Figure 8B:
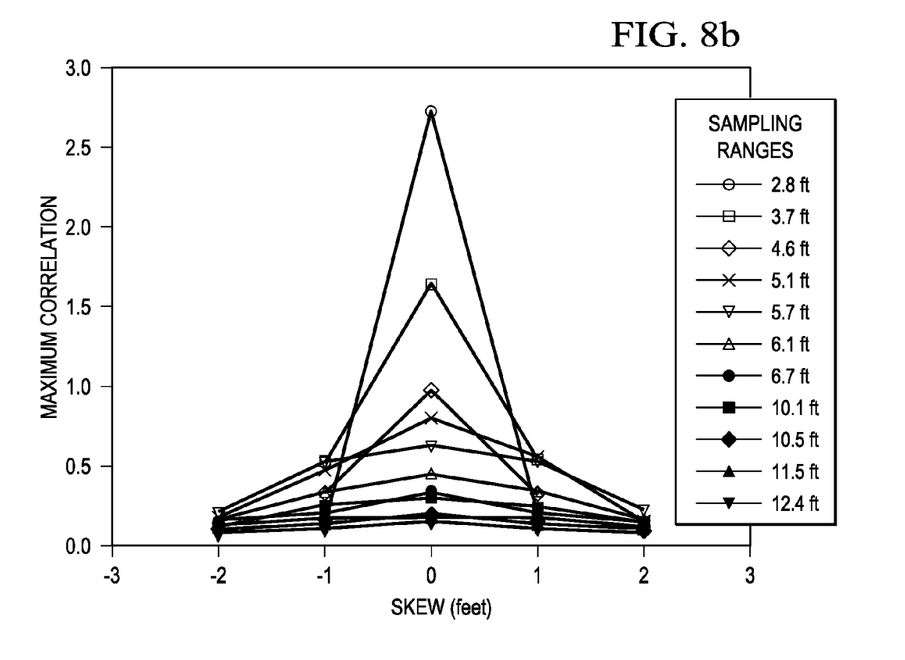
FIG. 8(b) is a graph of maximum correlation versus skew for different sampling ranges for SASR system of FIG. 7.

Turning now to FIG. 8(b), a graph of maximum correlation plotted against skew 750 in feet for different sampling ranges 760 for SASR system of FIG. 7 is shown. Note that abnomalies exist (maximum correlation greater than 1.0) for the near field (2.8 feet and 3.7 feet) read range. For sampling ranges of 2.8 feet and 3.7 feet and for low skews, maximum correlations of above 1.0 are observed. This is because at strong signal matching, amplitude is a large contributor in maximum correlation calculation. At low skews and low sampling ranges (2.8 feet and 3.7 feet), the amplitude of the received signal from the tag tends to be stronger than expected. This causes the maximum correlation to shoot beyond 1.0. Notice that the trends for the maximum correlation are exponential in nature and therefore would yield higher accuracies especially for LOS identification method.

Figure 8C:
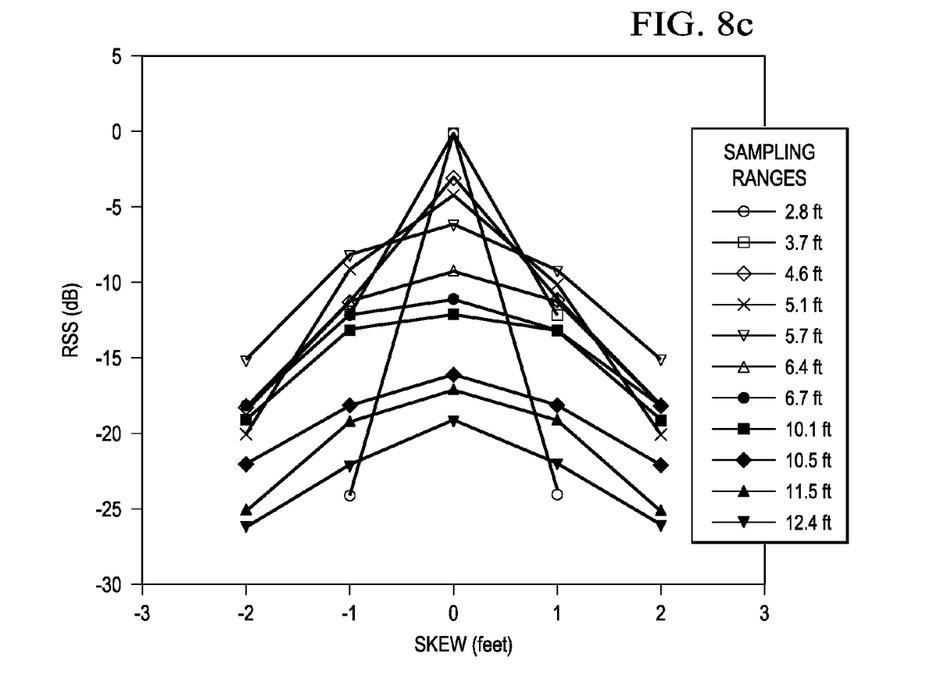
FIG. 8(c) is a graph of received signal strength versus skew for different sampling ranges for SASR system of FIG. 7.

Referring to FIG. 8(c), a graph is shown of received signal strength (RSS) in dB plotted against skew 750 in feet for different sampling ranges 760 for SASR system of FIG. 7.

Similar to the maximum correlation plot shown in FIG. 8(b), the RSS plots give a good indication of the tag LOS. However, notice that unlike the maximum correlation plot of FIG. 8(b), the RSS plots of FIG. 8(c) are not exponential in nature. The RSS plots are logarithmitic in nature and therefore are less accurate then the maximum correlation plots. Furthermore, the received signal strength is known to be highly suceptible to environmental changes.

Figure 8D:
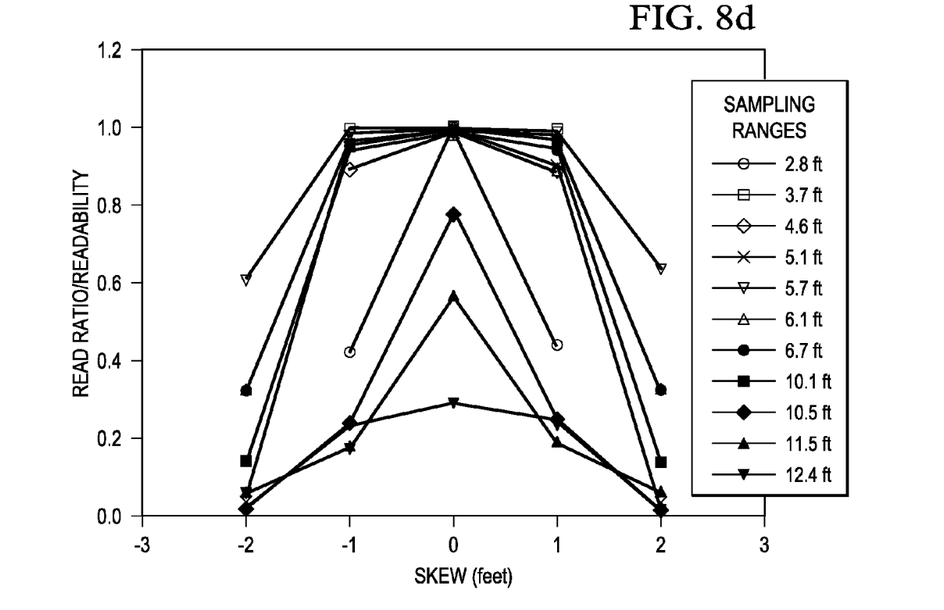
FIG. 8(d) is a graph of readability versus skew for different sampling ranges for SASR system of FIG. 7.

Turning now to FIG. 8(d), a graph of readability or read ratio plotted against skew 750 in feet for different sampling ranges 760 for SASR system of FIG. 7 is shown. As described above, read ratio or readability may be defined as the ratio of the actual reads that are successful for every thousand read attempts. In accordance with some embodiments of the invention, readability may not be used to locate a tag. However, as can be seen in FIG. 8(d) the plot of readability versus skew follows a predictable trend and has some resemblance to the RSS plot. Thus, in accordance with some embodiments of the invention, the readability plot may be used as a further check on the RSS, maximum correlation and read range values. For example, for a set of tag measurements, if the read ratio becomes small, than this may indicate that the tag is moving away from normal incidence 765. In such circumstances, as shown in the flowchart of FIG. 6, the number of tag measurements may need to be increased for higher accuracy of read range, RSS, and maximum correlation values used in determining tag location. Thus, the read ratio may function as a check on RSS, maximum correlation and read range values that ensures the location of the tag is successfully determined.

Figure 9:
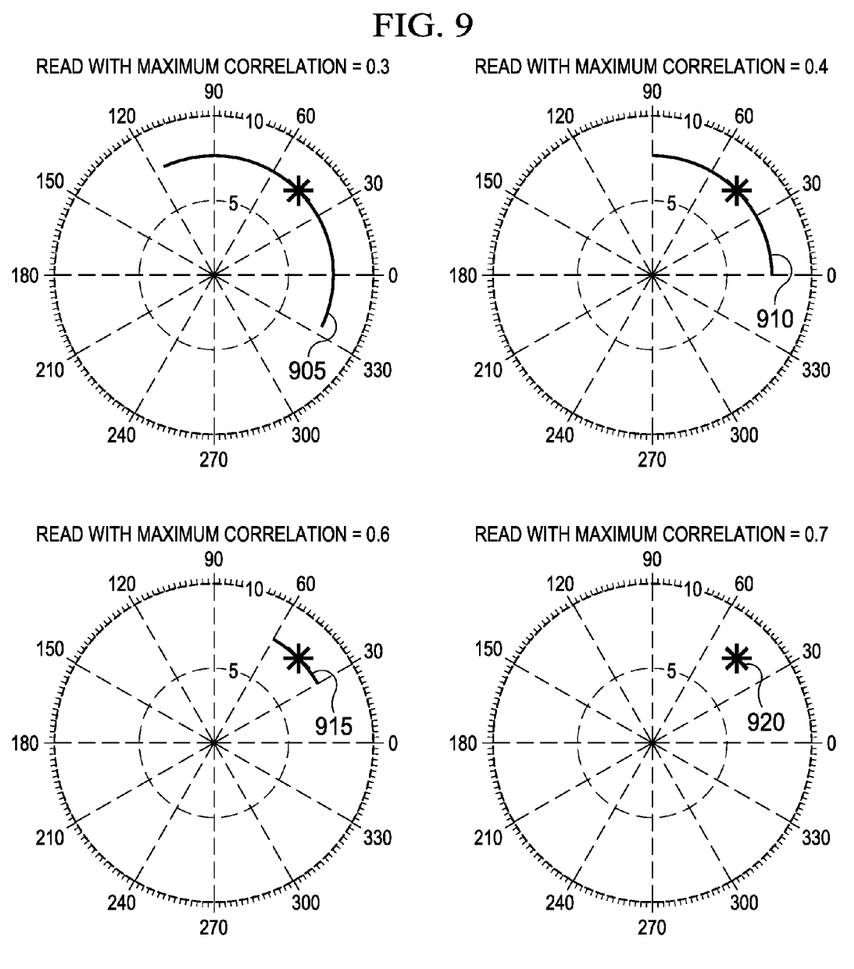
FIG. 9 shows four charts illustrating location determination of a tag using SASR system and method.

FIG. 9 shows four charts illustrating location determination of a tag using SASR system and method. Each chart is for one tag read measurement received by the reader 710. The SAW RFID tag is stationary while reader antenna rotates at a given angular velocity. Arcs 905, 910, 915, and 920 are estimates calculated as described above indicating the probability that the tag is present along a point in the arc for the maximum correlation values obtained. As can be seen from FIG. 9, as the maximum correlation decreases, the probability that the tag exists at the reader's current LOS location decreases tremendously. This produces a much longer arc for where the tag may be located. Thus, for a reader to tag maximum distance of 10 meters and a maximum correlation read of 0.9, the model presented works well to describe the accuracy of tag location $\Delta x$ and can be estimated using Equation 14.

$$\Delta x = 2d \tan(P_{tag} * 17°) \approx 3.17 \text{ cm} \quad (14)$$

As compared to 10 meters, an error of 3.17 cm is small. In Equation 14, the reader antenna's vertical beam-width is 17 degrees.

Tags may be attached to objects that are exposed to large vibrational stresses. The effect of vibration stress on the tag may cause errors in determining the location of the tag. Table 2 shows the vibration stress spectrum from 10 to 500 Hz on vertical axis (z-axis), transverse axis (x-axis), and longitudinal axis (y-axis) of objects being transported by truck over United States highway. The vibration stress spectrum is derived from MIL STD 810F, Table 514.3C and extends to 2000 Hz.

TABLE 2

| Vertical | | Transverse | | Longitudinal | |
|---|---|---|---|---|---|
| Hz | g²/Hz | Hz | g²/Hz | Hz | g²/Hz |
| 10 | 0.01500 | 10 | 0.00013 | 10 | 0.00650 |
| 40 | 0.01500 | 20 | 0.00065 | 20 | 0.00650 |

TABLE 2-continued

| Vertical | | Transverse | | Longitudinal | |
|---|---|---|---|---|---|
| Hz | g²/Hz | Hz | g²/Hz | Hz | g²/Hz |
| 500 | 0.00015 | 30 | 0.00065 | 120 | 0.00020 |
| 1.04 g rms | | 78 | 0.00002 | 121 | 0.00300 |
| | | 79 | 0.00019 | 200 | 0.00300 |
| | | 120 | 0.00019 | 240 | 0.00150 |
| | | 500 | 0.00001 | 340 | 0.00003 |
| | | 0.204 g rms | | 500 | 0.00015 |
| | | | | 0.740 g rms | |

Figure 10A:
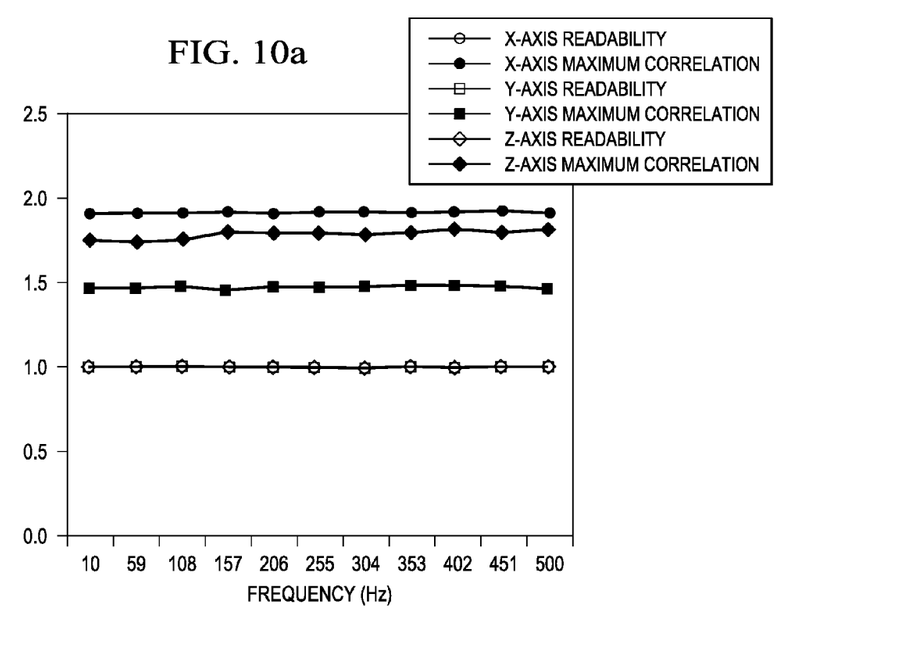
FIG. 10(a) shows graph of maximum correlation and readability versus frequency up to 500 Hz with application of vibrational stress on RFID tag from travel on highway truck.

FIG. 10(a) shows graph of maximum correlation and readability versus frequency with application of vibrational stress on RFID tag from travel on highway truck (Table 2). Stress is applied to the vertical z-axis of the tag from 10 to 500 Hz using the stress results from Table 2 to simulate motion on a truck. A set of tag read measurements are performed to determine maximum correlation and readability for the z-axis as shown in FIG. 10(a). Similarly, stress is applied to the transverse x-axis of the tag from 10 to 500 Hz using the stress results from Table 2 to simulate motion on a truck. A set of tag read measurements are performed to determine maximum correlation and readability for the x-axis as shown in FIG. 10(a). Lastly, stress is applied to the longitudinal y-axis of the tag from 10 to 500 Hz using the stress results from Table 2 to simulate motion on a truck. A set of tag read measurements are performed to determine maximum correlation and readability for the y-axis as shown in FIG. 10(a). In FIG. 10(a), vibration on the x-axis, y-axis, or z-axis does not affect the readability of the system, the readability is maintained at 1.0 (or 100%).

Figure 10B:
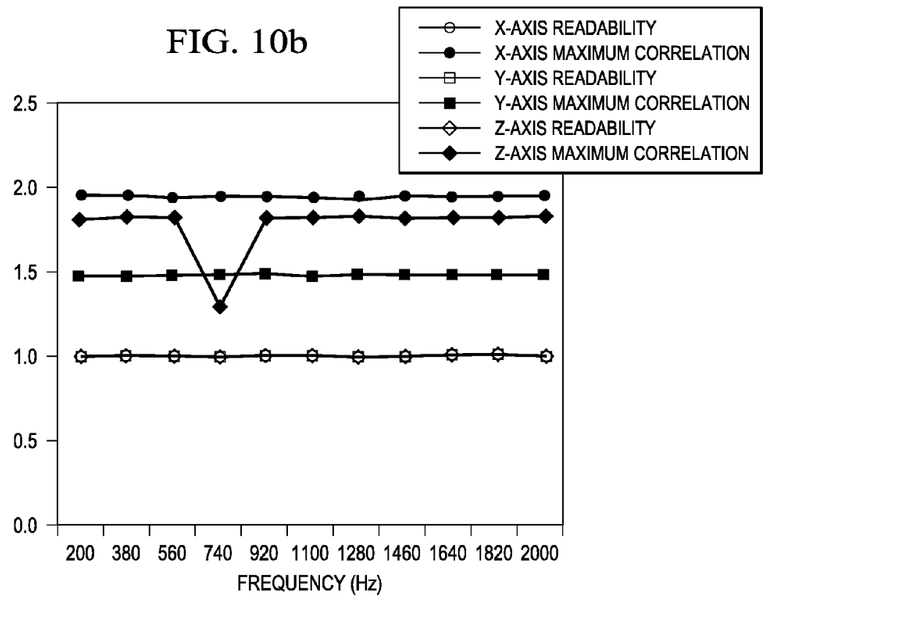
FIG. 10(b) shows graph of maximum correlation and readability versus frequency up to 2000 Hz with application of vibrational stress on RFID tag from travel on highway truck.

FIG. 10(b) shows graph of maximum correlation and readability versus frequency up to 2000 Hz with application of vibrational stress on RFID tag from travel on highway truck (Table 2). Stress is applied to the vertical z-axis, transverse x-axis, and longitudinal y-axis of the tag from 10 to 2000 Hz using the stress results from Table 2 (up to 2000 Hz not shown) to simulate motion on a truck. A set of tag read measurements are performed to determine maximum correlation and readability for the three axes as shown in FIG. 10(b). In FIG. 10(b), as in FIG. 10(a), vibration on the x-axis, y-axis, or z-axis does not affect the readability of the system, the readability is maintained at 1.0 (or 100%). FIG. 10(a) and FIG. 10(b) indicate that vibrational stress for any frequency between 10 Hz and 2000 Hz has no effect on the performance of the SAW RFID system.

While the present invention has been described with respect to a limited number of embodiments, those skilled in the art will appreciate numerous modifications and variations there from. Thus, in accordance with some embodiments of the invention, the SAW RFID real time location system using a single antenna single reader may be modified to locate a tag in 3-dimensional (3D) localization system. Such a system may determine the location of the tag by separating the 3D space into two 2D spaces and calculating the tag location in each of the 2D spaces as described above. It is intended that the appended claims cover all such modifications and variations as fall within the true spirit and scope of this present invention.

What is claimed is:

1. A method for locating a tag, comprising:
transmitting an interrogation signal from a reader with a single antenna to the tag, wherein the single antenna is in motion;
receiving a response signal at the reader from the tag;

determining the range of the tag from the reader;

determining the received signal strength (RSS) of the response signal at the reader from the tag;

determining the maximum correlation of the response signal at the reader from the tag; and determining the location of the tag using range of the tag from the reader, received signal strength and maximum correlation of the response signal.

2. The method of claim 1, wherein the interrogation signal is an impulse spike or ramp signal.

3. The method of claim 1, wherein the single antenna rotates at an angular velocity.

4. The method of claim 1, wherein determining the range comprises:

determining roundtrip time of flight from transmitting interrogation signal to receiving the response signal;

subtracting tag time delay from roundtrip time of flight, wherein the tag time delay is a known value from design of tag;

calculating the one-way time of flight from reader to tag by dividing by two the result of subtracting tag time delay from roundtrip time of flight; and multiplying the one-way time of flight by velocity of radio frequency signal to determine the range of the tag from the reader.

5. A machine-readable medium that provides instructions, which when executed by a machine, cause said machine to perform operations of locating a tag comprising:

transmitting an interrogation signal from a reader with a single antenna to the tag, wherein the single antenna is in motion;

receiving a response signal at the reader from the tag;

determining the range of the tag from the reader;

determining the received signal strength (RSS) of the response signal at the reader from the tag;

determining the maximum correlation of the response signal at the reader from the tag; and determining the location of the tag using range of the tag from the reader, received signal strength and maximum correlation of the response signal.

6. A machine-readable medium of claim 5, wherein the interrogation signal is an impulse spike or ramp signal.

7. A machine-readable medium of claim 6, wherein the single antenna rotates at an angular velocity.

8. A machine-readable medium of claim 6, wherein determining the range comprises:

determining roundtrip time of flight from transmitting interrogation signal to receiving the response signal;

subtracting tag time delay from roundtrip time of flight, wherein the tag time delay is a known value from design of tag;

calculating the one-way time of flight from reader to tag by dividing by two the result of subtracting tag time delay from roundtrip time of flight; and multiplying the one-way time of flight by velocity of radio frequency signal to determine the range of the tag from the reader.

9. A system for locating a tag, comprising:

a reader;

a reader antenna operably coupled to the reader, wherein the reader antenna is in motion;

a tag operably coupled to the reader antenna, said reader transmitting an interrogation signal to the tag and receiving a response signal from the tag;

wherein the reader determines the range of the tag from the reader, received signal strength (RSS) of the response signal at the reader from the tag, and the maximum correlation of the response signal at the reader from the tag;

wherein the reader determines the location of the tag using range of the tag from the reader, RSS, and maximum correlation of the response signal.

10. The system of claim 9, further comprising a tag antenna operably coupled to the reader antenna.

11. The system of claim 10, wherein the tag antenna is a patch antenna.

12. The system of claim 9, wherein the reader comprises an information subsystem.

13. The system of claim 9, wherein the tag comprises an interdigital transducer (IDT) operably coupled to the tag antenna, and a series of wave reflectors operably coupled to the IDT.

14. The system of claim 9, wherein the reader antenna has a horizontal beam width of 22 degrees and vertical beam width of 17 degrees.

15. The system of claim 9, wherein the reader antenna rotates at an angular velocity.

16. The system of claim 9, wherein the tag is unpowered.

* * * * *